US011353319B2

(12) United States Patent
Laffargue et al.

(10) Patent No.: US 11,353,319 B2
(45) Date of Patent: *Jun. 7, 2022

(54) METHOD FOR A MOBILE DIMENSIONING DEVICE TO USE A DYNAMIC ACCURACY COMPATIBLE WITH NIST STANDARD

(71) Applicant: Hand Held Products, Inc., Fort Mill, SC (US)

(72) Inventors: Franck Laffargue, Toulouse (FR); Scott McCloskey, Minneapolis, MN (US); H. Sprague Ackley, Seattle, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/507,338

(22) Filed: Jul. 10, 2019

(65) Prior Publication Data

US 2019/0339057 A1    Nov. 7, 2019

Related U.S. Application Data

(63) Continuation of application No. 15/146,084, filed on May 4, 2016, now Pat. No. 10,393,506.

(30) Foreign Application Priority Data

Jul. 15, 2015  (EP) .................................. 15176943

(51) Int. Cl.
*G06F 3/0481*   (2013.01)
*G06F 3/0484*   (2013.01)
(Continued)

(52) U.S. Cl.
CPC ............ *G01B 11/02* (2013.01); *G01B 21/047* (2013.01); *G06F 3/0484* (2013.01);
(Continued)

(58) Field of Classification Search
CPC ..... G06T 15/08; G06T 2215/16; G01B 11/02; G01B 21/047; G06F 3/04817; G06F 3/0484
See application file for complete search history.

(56) References Cited

U.S. PATENT DOCUMENTS 3,971,065 A    7/1976   Bayer
4,026,031 A    5/1977   Siddall et al.
(Continued)

FOREIGN PATENT DOCUMENTS

AU    2004212587 A1    4/2005
CN     101149462 A     3/2008
(Continued)

OTHER PUBLICATIONS

Search Report in counterpart European Application No. 15182675.7, dated Dec. 4, 2015, 10 pages.
(Continued)

*Primary Examiner* — Shaghayegh Azima
(74) *Attorney, Agent, or Firm* — Alston & Bird LLP

(57) ABSTRACT

A mobile dimensioning device, i.e. a mobile dimensioner, is described that uses a dynamic accuracy while still being compatible with the NIST standard. Even if the accuracy division is dynamic and not predetermined, a mobile dimensioning device of the present invention reports the actual dimensioning prior to measurement capture and can therefore be certified and used in commercial transactions.

20 Claims, 6 Drawing Sheets

(51) Int. Cl.
  *G01B 11/02*     (2006.01)
  *G01B 21/04*     (2006.01)
  *G06F 3/04817*   (2022.01)
  *G06T 15/08*     (2011.01)

(52) U.S. Cl.
  CPC .......... *G06F 3/04817* (2013.01); *G06T 15/08* (2013.01); *G06T 2215/16* (2013.01)

(56) References Cited

U.S. PATENT DOCUMENTS

| | | | |
|---|---|---|---|
| 4,279,328 A | 7/1981 | Ahlbom | |
| 4,398,811 A | 8/1983 | Nishioka et al. | |
| 4,495,559 A | 1/1985 | Gelatt et al. | |
| 4,730,190 A | 3/1988 | Win et al. | |
| 4,803,639 A | 2/1989 | Steele et al. | |
| 5,184,733 A | 2/1993 | Arnarson et al. | |
| 5,198,648 A | 3/1993 | Hibbard | |
| 5,220,536 A | 6/1993 | Stringer et al. | |
| 5,331,118 A | 7/1994 | Jensen | |
| 5,359,185 A | 10/1994 | Hanson | |
| 5,384,901 A | 1/1995 | Glassner et al. | |
| 5,548,707 A | 8/1996 | Lonegro et al. | |
| 5,555,090 A | 9/1996 | Schmutz | |
| 5,561,526 A | 10/1996 | Huber et al. | |
| 5,590,060 A | 12/1996 | Granville et al. | |
| 5,606,534 A | 2/1997 | Stringer et al. | |
| 5,619,245 A | 4/1997 | Kessler et al. | |
| 5,655,095 A | 8/1997 | Lonegro et al. | |
| 5,661,561 A | 8/1997 | Wurz et al. | |
| 5,699,161 A | 12/1997 | Woodworth | |
| 5,729,750 A | 3/1998 | Ishida | |
| 5,730,252 A | 3/1998 | Herbinet | |
| 5,732,147 A | 3/1998 | Tao | |
| 5,734,476 A | 3/1998 | Dlugos | |
| 5,737,074 A | 4/1998 | Haga et al. | |
| 5,748,199 A | 5/1998 | Palm | |
| 5,767,962 A | 6/1998 | Suzuki et al. | |
| 5,831,737 A | 11/1998 | Stringer et al. | |
| 5,850,370 A | 12/1998 | Stringer et al. | |
| 5,850,490 A | 12/1998 | Johnson | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,929,856 A | 7/1999 | Lonegro et al. | |
| 5,938,710 A | 8/1999 | Lanza et al. | |
| 5,959,568 A | 9/1999 | Woolley | |
| 5,960,098 A | 9/1999 | Tao | |
| 5,969,823 A | 10/1999 | Wurz et al. | |
| 5,978,512 A | 11/1999 | Kim | |
| 5,979,760 A | 11/1999 | Freyman et al. | |
| 5,988,862 A | 11/1999 | Kacyra et al. | |
| 5,991,041 A | 11/1999 | Woodworth | |
| 6,009,189 A | 12/1999 | Schaack | |
| 6,025,847 A | 2/2000 | Marks | |
| 6,035,067 A | 3/2000 | Ponticos | |
| 6,049,386 A | 4/2000 | Stringer et al. | |
| 6,053,409 A | 4/2000 | Brobst et al. | |
| 6,064,759 A | 5/2000 | Buckley et al. | |
| 6,067,110 A | 5/2000 | Nonaka et al. | |
| 6,069,696 A | 5/2000 | Mcqueen et al. | |
| 6,115,114 A | 9/2000 | Berg et al. | |
| 6,137,577 A | 10/2000 | Woodworth | |
| 6,177,999 B1 | 1/2001 | Wurz et al. | |
| 6,189,223 B1 | 2/2001 | Haug | |
| 6,232,597 B1 * | 5/2001 | Kley ............... | G02B 21/002 250/234 |
| 6,236,403 B1 | 5/2001 | Chaki et al. | |
| 6,246,468 B1 | 6/2001 | Dimsdale | |
| 6,333,749 B1 | 12/2001 | Reinhardt et al. | |
| 6,336,587 B1 | 1/2002 | He et al. | |
| 6,369,401 B1 | 4/2002 | Lee | |
| 6,373,579 B1 | 4/2002 | Ober et al. | |
| 6,429,803 B1 | 8/2002 | Kumar | |
| 6,457,642 B1 | 10/2002 | Good et al. | |
| 6,507,406 B1 | 1/2003 | Vagi et al. | |
| 6,517,004 B2 | 2/2003 | Good et al. | |
| 6,519,550 B1 | 2/2003 | D et al. | |
| 6,535,776 B1 | 3/2003 | Tobin et al. | |
| 6,674,904 B1 | 1/2004 | Mcqueen | |
| 6,705,526 B1 | 3/2004 | Zhu et al. | |
| 6,781,621 B1 | 8/2004 | Gobush et al. | |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,922,632 B2 | 7/2005 | Foxlin | |
| 6,971,580 B2 | 12/2005 | Zhu et al. | |
| 6,995,762 B1 | 2/2006 | Pavlidis et al. | |
| 7,057,632 B2 | 6/2006 | Yamawaki et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Zhu et al. | |
| 7,137,556 B1 | 11/2006 | Bonner et al. | |
| 7,159,783 B2 | 1/2007 | Walczyk et al. | |
| 7,161,688 B1 | 1/2007 | Bonner et al. | |
| 7,205,529 B2 | 4/2007 | Andersen et al. | |
| 7,214,954 B2 | 5/2007 | Schopp | |
| 7,277,187 B2 | 10/2007 | Smith et al. | |
| 7,307,653 B2 | 12/2007 | Dutta | |
| 7,310,431 B2 | 12/2007 | Gokturk et al. | |
| 7,353,137 B2 | 4/2008 | Vock et al. | |
| 7,413,127 B2 * | 8/2008 | Ehrhart ............... | G06K 7/14 235/462.01 |
| 7,509,529 B2 | 3/2009 | Colucci et al. | |
| 7,527,205 B2 | 5/2009 | Zhu et al. | |
| 7,586,049 B2 | 9/2009 | Wurz | |
| 7,602,404 B1 | 10/2009 | Reinhardt et al. | |
| 7,639,722 B1 | 12/2009 | Paxton et al. | |
| 7,726,575 B2 | 6/2010 | Wang et al. | |
| 7,780,084 B2 | 8/2010 | Zhang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,072,581 B1 | 12/2011 | Breiholz | |
| 8,102,395 B2 | 1/2012 | Kondo et al. | |
| 8,132,728 B2 | 3/2012 | Dwinell et al. | |
| 8,134,717 B2 | 3/2012 | Pangrazio et al. | |
| 8,149,224 B1 | 4/2012 | Kuo et al. | |
| 8,175,640 B2 * | 5/2012 | Choi ............... | H04N 21/43637 455/556.1 |
| 8,194,097 B2 | 6/2012 | Xiao et al. | |
| 8,201,737 B1 | 6/2012 | Palacios et al. | |
| 8,212,158 B2 | 7/2012 | Wiest | |
| 8,212,889 B2 | 7/2012 | Chanas et al. | |
| 8,228,510 B2 | 7/2012 | Pangrazio et al. | |
| 8,230,367 B2 | 7/2012 | Bell et al. | |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Liu | |
| 8,339,462 B2 | 12/2012 | Stec et al. | |
| 8,350,959 B2 | 1/2013 | Topliss et al. | |
| 8,351,670 B2 | 1/2013 | Ijiri et al. | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,976 B2 | 2/2013 | Mohideen et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,437,539 B2 | 5/2013 | Komatsu et al. | |
| 8,441,749 B2 | 5/2013 | Brown et al. | |
| 8,448,863 B2 | 5/2013 | Xian et al. | |
| 8,457,013 B2 | 6/2013 | Essinger et al. | |

(56) References Cited

U.S. PATENT DOCUMENTS

| | | |
|---|---|---|
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2* | 9/2013 | Ehrhart .............. G06K 7/10861 235/462.02 |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2* | 11/2014 | Sauerwein, Jr. ........................... H04N 21/41407 375/240.25 |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |

(56) References Cited

U.S. PATENT DOCUMENTS

| | | |
|---|---|---|
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 * | 4/2015 | Truyen .................... G06T 19/00 382/128 |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 * | 6/2015 | Showering ............. G06K 9/228 |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 | 7/2015 | Holeva et al. |
| 9,142,035 B1 | 9/2015 | Rotman et al. |
| 9,171,278 B1 | 10/2015 | Kong et al. |
| 9,208,550 B2 * | 12/2015 | Chen .............. H04N 5/232123 |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,233,470 B1 | 1/2016 | Bradski et al. |
| 9,235,899 B1 | 1/2016 | Kirmani et al. |
| 9,250,712 B1 | 2/2016 | Todeschini |
| 9,258,033 B2 | 2/2016 | Showering |
| 9,262,633 B1 | 2/2016 | Todeschini et al. |
| 9,299,013 B1 | 3/2016 | Curlander et al. |
| 9,310,609 B2 | 4/2016 | Rueblinger et al. |
| D757,009 S | 5/2016 | Oberpriller et al. |
| 9,342,724 B2 | 5/2016 | Mccloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,411,787 B1 * | 8/2016 | Lad ..................... H04L 12/4633 |
| 9,412,242 B2 | 8/2016 | Van et al. |
| 9,424,749 B1 | 8/2016 | Reed et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| D771,631 S | 11/2016 | Fitch et al. |
| 9,486,921 B1 * | 11/2016 | Straszheim ............ B25J 9/1679 |
| 9,507,974 B1 | 11/2016 | Todeschini |
| 9,508,099 B2 * | 11/2016 | Cancro ................ H04B 5/0031 |
| D777,166 S | 1/2017 | Bidwell et al. |
| D783,601 S | 4/2017 | Schulte et al. |
| 9,632,658 B2 * | 4/2017 | Holz ................... G06F 3/04817 |
| D785,617 S | 5/2017 | Bidwell et al. |
| D785,636 S | 5/2017 | Oberpriller et al. |
| D790,505 S | 6/2017 | Vargo et al. |
| D790,546 S | 6/2017 | Zhou et al. |
| D790,553 S | 6/2017 | Fitch et al. |
| 9,778,767 B2 * | 10/2017 | Nakata .................. G06F 1/1643 |
| 9,786,101 B2 | 10/2017 | Ackley |
| 9,826,220 B2 | 11/2017 | Laffargue et al. |
| 9,828,223 B2 | 11/2017 | Svensson et al. |
| 9,835,486 B2 | 12/2017 | Ackley |
| 9,857,167 B2 | 1/2018 | Jovanovski et al. |
| 9,891,612 B2 | 2/2018 | Charpentier et al. |
| 9,892,876 B2 | 2/2018 | Bandringa |
| 9,954,871 B2 | 4/2018 | Hussey et al. |
| 9,978,088 B2 | 5/2018 | Pape |
| 10,007,112 B2 | 6/2018 | Fitch et al. |
| 10,025,314 B2 | 7/2018 | Houle et al. |
| 10,038,716 B2 | 7/2018 | Todeschini et al. |
| 10,066,982 B2 | 9/2018 | Ackley et al. |
| 10,094,650 B2 | 10/2018 | Todeschini |
| 10,163,216 B2 | 12/2018 | Ackley |
| 10,249,030 B2 | 4/2019 | McCloskey et al. |
| 10,360,728 B2 | 7/2019 | Venkatesha et al. |
| 10,393,506 B2 * | 8/2019 | Laffargue ............. G06F 3/0484 |
| 10,401,436 B2 | 9/2019 | Young et al. |
| 10,612,958 B2 | 4/2020 | Ackley |
| 10,709,425 B2 * | 7/2020 | Waechter-Stehle ....... G06T 7/10 |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0067855 A1 | 6/2002 | Chiu et al. |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizoiie et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 * | 9/2004 | Schopp .................... G01B 11/04 356/625 |
| 2004/0211836 A1 | 10/2004 | Patel et al. |
| 2004/0214623 A1 | 10/2004 | Takahashi et al. |
| 2004/0233461 A1 | 11/2004 | Armstrong et al. |

(56) References Cited

U.S. PATENT DOCUMENTS

| | | |
|---|---|---|
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Lueder |
| 2005/0128196 A1 | 6/2005 | Popescu et al. |
| 2005/0168488 A1 | 8/2005 | Montague |
| 2005/0211782 A1 | 9/2005 | Martin et al. |
| 2005/0257748 A1 | 11/2005 | Kriesel et al. |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0112023 A1 | 5/2006 | Horhann et al. |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0230640 A1 | 10/2006 | Chen |
| 2006/0232681 A1 | 10/2006 | Okada |
| 2006/0255150 A1 | 11/2006 | Longacre, Jr. |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1* | 6/2007 | Cohen .................. G01J 3/44 356/326 |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0062164 A1 | 3/2008 | Bassi et al. |
| 2008/0077265 A1 | 3/2008 | Boyden et al. |
| 2008/0079955 A1 | 4/2008 | Storm |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0022369 A1* | 1/2009 | Satoh .................. G01B 21/04 382/106 |
| 2009/0038182 A1 | 2/2009 | Lans et al. |
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0258445 A1* | 10/2009 | Zhou .................. H01L 22/12 438/14 |
| 2009/0268023 A1 | 10/2009 | Hsieh |
| 2009/0272724 A1 | 11/2009 | Gubler et al. |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg et al. |
| 2010/0035637 A1 | 2/2010 | Varanasi et al. |
| 2010/0060604 A1 | 3/2010 | Zwart et al. |
| 2010/0091104 A1 | 4/2010 | Sprigle et al. |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1* | 7/2010 | Prokoski ................. A61B 5/418 382/132 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0274728 A1 | 10/2010 | Kugelman |
| 2010/0303336 A1 | 12/2010 | Abraham et al. |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1* | 2/2011 | Brenner ................. G06T 7/0016 600/476 |
| 2011/0043609 A1 | 2/2011 | Choi et al. |
| 2011/0099474 A1* | 4/2011 | Grossman ............... G06F 9/453 715/709 |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman et al. |
| 2011/0301994 A1 | 12/2011 | Tieman |
| 2011/0303748 A1 | 12/2011 | Lemma et al. |
| 2011/0310227 A1* | 12/2011 | Konertz ................. G06T 19/006 348/46 |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rhoads et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0261474 A1 | 10/2012 | Kawashime et al. |
| 2012/0262484 A1* | 10/2012 | Gottfeld .................. G09B 5/065 345/632 |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |

(56) References Cited

U.S. PATENT DOCUMENTS

| | | |
|---|---|---|
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta et al. |
| 2012/0314058 A1* | 12/2012 | Bendall .................... G06T 7/50 348/135 |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1* | 6/2013 | Muraoka ............... G06T 7/0016 382/103 |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbeck et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0230074 A1* | 9/2013 | Shin ........................ G01K 1/20 374/129 |
| 2013/0247403 A1* | 9/2013 | Hayashida ............... G01D 7/00 33/505 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1 | 12/2013 | Bartos et al. |
| 2013/0329013 A1* | 12/2013 | Metois ................. H04N 13/204 348/46 |
| 2013/0342342 A1 | 12/2013 | Sabre et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | Mcnamer et al. |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein, Jr. |
| 2014/0036848 A1 | 2/2014 | Pease et al. |
| 2014/0039674 A1 | 2/2014 | Motoyama et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1* | 2/2014 | Laffargue ............... G01F 17/00 348/135 |
| 2014/0050367 A1* | 2/2014 | Chen .................... G06T 7/0002 382/112 |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0098091 A1* | 4/2014 | Hori ........................ G06T 19/20 345/419 |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | Mccloskey et al. |
| 2014/0104414 A1 | 4/2014 | Mccloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0177931 A1 | 6/2014 | Kocherscheidt et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |

(56) References Cited

U.S. PATENT DOCUMENTS

| | | |
|---|---|---|
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1* | 8/2014 | Hirata ............... H04N 5/23232 348/38 |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0300722 A1* | 10/2014 | Garcia ................ G06F 3/0482 348/77 |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0333775 A1 | 11/2014 | Naikal et al. |
| 2014/0344943 A1 | 11/2014 | Todeschini et al. |
| 2014/0346233 A1 | 11/2014 | Liu et al. |
| 2014/0347533 A1 | 11/2014 | Toyoda |
| 2014/0350710 A1 | 11/2014 | Gopalakrishnan et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1* | 12/2014 | Nishitani ........... G06Q 30/0283 705/400 |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062160 A1 | 3/2015 | Sakamoto et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0070158 A1 | 3/2015 | Hayasaka |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0117749 A1 | 4/2015 | Smith et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You et al. |
| 2015/0169925 A1 | 6/2015 | Chen et al. |
| 2015/0169929 A1 | 6/2015 | Williams et al. |
| 2015/0178900 A1 | 6/2015 | Kim et al. |
| 2015/0182844 A1 | 7/2015 | Jang |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0193759 A1* | 7/2015 | Fukuda ................ G07G 1/12 705/23 |
| 2015/0199957 A1 | 7/2015 | Funyak et al. |
| 2015/0201181 A1 | 7/2015 | Moore et al. |
| 2015/0204662 A1* | 7/2015 | Kobayashi ............ G01B 11/25 356/610 |
| 2015/0204671 A1 | 7/2015 | Showering |
| 2015/0210199 A1 | 7/2015 | Payne |
| 2015/0213647 A1 | 7/2015 | Laffargue et al. |
| 2015/0219748 A1 | 8/2015 | Hyatt et al. |
| 2015/0220257 A1* | 8/2015 | Moore ................ G06F 3/04845 715/765 |
| 2015/0220753 A1 | 8/2015 | Zhu et al. |
| 2015/0229838 A1* | 8/2015 | Hakim ............. H04N 5/232941 348/333.02 |
| 2015/0254485 A1 | 9/2015 | Feng et al. |
| 2015/0269403 A1 | 9/2015 | Lei et al. |
| 2015/0276379 A1 | 10/2015 | Ni et al. |
| 2015/0308816 A1 | 10/2015 | Laffargue |
| 2015/0316368 A1 | 11/2015 | Moench et al. |
| 2015/0325036 A1 | 11/2015 | Lee |
| 2015/0327012 A1 | 11/2015 | Bian et al. |
| 2015/0332463 A1 | 11/2015 | Galera et al. |
| 2015/0355470 A1 | 12/2015 | Herschbach |
| 2016/0014251 A1 | 1/2016 | Hejl |
| 2016/0040982 A1 | 2/2016 | Li et al. |
| 2016/0042241 A1 | 2/2016 | Todeschini |
| 2016/0048725 A1 | 2/2016 | Holz et al. |
| 2016/0057230 A1 | 2/2016 | Todeschini et al. |
| 2016/0063429 A1 | 3/2016 | Varley et al. |
| 2016/0070982 A1 | 3/2016 | Jachalsky et al. |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0101936 A1 | 4/2016 | Chamberlin |

(56) References Cited

U.S. PATENT DOCUMENTS

| | | | |
|---|---|---|---|
| 2016/0102975 | A1 | 4/2016 | Mccloskey et al. |
| 2016/0104019 | A1 | 4/2016 | Todeschini et al. |
| 2016/0104274 | A1 | 4/2016 | Jovanovski et al. |
| 2016/0109219 | A1 | 4/2016 | Ackley et al. |
| 2016/0109220 | A1 | 4/2016 | Laffargue et al. |
| 2016/0109224 | A1 | 4/2016 | Thuries et al. |
| 2016/0112631 | A1 | 4/2016 | Ackley et al. |
| 2016/0112643 | A1 | 4/2016 | Laffargue et al. |
| 2016/0124516 | A1 | 5/2016 | Schoon et al. |
| 2016/0125217 | A1 | 5/2016 | Todeschini |
| 2016/0125342 | A1 | 5/2016 | Miller et al. |
| 2016/0125873 | A1 | 5/2016 | Braho et al. |
| 2016/0133253 | A1 | 5/2016 | Braho et al. |
| 2016/0138247 | A1 | 5/2016 | Conway et al. |
| 2016/0138248 | A1 | 5/2016 | Conway et al. |
| 2016/0138249 | A1 | 5/2016 | Conway et al. |
| 2016/0169665 | A1 | 6/2016 | Deschenes et al. |
| 2016/0171720 | A1 | 6/2016 | Todeschini |
| 2016/0178479 | A1 | 6/2016 | Goldsmith |
| 2016/0180678 | A1 | 6/2016 | Ackley et al. |
| 2016/0187186 | A1 | 6/2016 | Coleman et al. |
| 2016/0187187 | A1 | 6/2016 | Coleman et al. |
| 2016/0187210 | A1 | 6/2016 | Coleman et al. |
| 2016/0188181 | A1* | 6/2016 | Smith ............... G06F 3/04886 715/765 |
| 2016/0189087 | A1 | 6/2016 | Morton et al. |
| 2016/0191801 | A1 | 6/2016 | Sivan |
| 2016/0202478 | A1 | 7/2016 | Masson et al. |
| 2016/0203641 | A1 | 7/2016 | Bostick et al. |
| 2016/0223474 | A1 | 8/2016 | Tang et al. |
| 2016/0227912 | A1 | 8/2016 | Oberpriller et al. |
| 2016/0233891 | A1 | 8/2016 | Pecorari |
| 2016/0292477 | A1 | 10/2016 | Bidwell |
| 2016/0294779 | A1 | 10/2016 | Yeakley et al. |
| 2016/0306769 | A1 | 10/2016 | Kohtz et al. |
| 2016/0314276 | A1 | 10/2016 | Wilz et al. |
| 2016/0314294 | A1 | 10/2016 | Kubler et al. |
| 2016/0343176 | A1 | 11/2016 | Ackley |
| 2016/0370605 | A1* | 12/2016 | Ain-Kedem ....... G06K 9/00604 |
| 2016/0377414 | A1 | 12/2016 | Thuries et al. |
| 2017/0017301 | A1 | 1/2017 | Doornenbal et al. |
| 2017/0091706 | A1 | 3/2017 | Lloyd et al. |
| 2017/0115490 | A1 | 4/2017 | Hsieh et al. |
| 2017/0121158 | A1 | 5/2017 | Wong et al. |
| 2017/0182942 | A1 | 6/2017 | Hardy et al. |

FOREIGN PATENT DOCUMENTS

| | | |
|---|---|---|
| CN | 201139117 Y | 10/2008 |
| CN | 101388073 A | 3/2009 |
| CN | 101433473 A | 5/2009 |
| CN | 103217108 A | 7/2013 |
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 2013117 A1 | 1/2009 |
| EP | 2286932 A2 | 2/2011 |
| EP | 2372648 A2 | 10/2011 |
| EP | 2381421 A2 | 10/2011 |
| EP | 2533009 A2 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 4/2016 |
| EP | 3007096 A1 | 4/2016 |
| EP | 3012601 A1 | 4/2016 |
| GB | 2503978 A | 1/2014 |
| GB | 2525053 A | 10/2015 |
| GB | 2531928 A | 5/2016 |
| JP | 04-129902 A | 4/1992 |
| JP | 2006-096457 A | 4/2006 |
| JP | 2007-084162 A | 4/2007 |
| JP | 2008-210276 A | 9/2008 |
| JP | 2014-210646 A | 11/2014 |
| JP | 2015-174705 A | 10/2015 |
| KR | 10-2010-0020115 A | 2/2010 |
| KR | 10-2011-0013200 A | 2/2011 |
| KR | 10-2011-0117020 A | 10/2011 |
| KR | 10-2012-0028109 A | 3/2012 |
| WO | 96/40452 A1 | 12/1996 |
| WO | 00/77726 A1 | 12/2000 |
| WO | 01/14836 A1 | 3/2001 |
| WO | 2006/095110 A1 | 9/2006 |
| WO | 2007/012554 A1 | 2/2007 |
| WO | 2007/015059 A1 | 2/2007 |
| WO | 2007/125554 A1 | 11/2007 |
| WO | 2011/017241 A1 | 2/2011 |
| WO | 2012/175731 A1 | 12/2012 |
| WO | 2013/021157 A1 | 2/2013 |
| WO | 2013/033442 A1 | 3/2013 |
| WO | 2013/163789 A1 | 11/2013 |
| WO | 2013/166368 A1 | 11/2013 |
| WO | 2013/173985 A1 | 11/2013 |
| WO | 2013/184340 A1 | 12/2013 |
| WO | 2014/019130 A1 | 2/2014 |
| WO | 2014/023697 A1 | 2/2014 |
| WO | 2014/102341 A1 | 7/2014 |
| WO | 2014/110495 A2 | 7/2014 |
| WO | 2014/149702 A1 | 9/2014 |
| WO | 2014/151746 A2 | 9/2014 |
| WO | 2015/006865 A1 | 1/2015 |
| WO | 2016/020038 A1 | 2/2016 |
| WO | 2016/061699 A1 | 4/2016 |

OTHER PUBLICATIONS

Second Chinese Office Action in related CN Application No. 201520810313.3, dated Mar. 22, 2016, 5 pages. English Translation provided.

Second Chinese Office Action in related CN Application No. 201520810685.6, dated Mar. 22, 2016, 5 pages.

Second Chinese Office Action in related CN Application No. 2015220810562.2, dated Mar. 22, 2016, 5 pages. English Translation provided.

Sill Optics, Examiner Cited NPL in Advisory Action dated Apr. 12, 2017 in related commonly owned application, http://WWW.silloptics. de/1/products/sill-encyclopedia/laser-optics/f-theta-lenses/,4 pages.

Spiller, Jonathan; Object Localization Using Deformable Templates, Master's Dissertation, University of the Witwatersrand, Johannesburg, South Africa, 2007; 74 pages.

Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 17 in related Application.]

Thoriabs, Examiner Cited NPL in Advisory Action dated Apr. 12, 2017 in related commonly owned application, downloaded from https://www.thorlabs.com/newgrouppage9.cfm?objectgroup_id=6430, 4 pages.

U.S. Pat. Appl. filed Feb. 7, 2012, (Feng et al.); now abandoned., U.S. Appl. No. 13/367,978.

U.S. Patent Application for Multifunction Point of Sale Apparatus With Optical Signature Capture filed Jul. 30, 2014 (Good et al.); 37 pages; now abandoned, U.S. Appl. No. 14/446,391.

U.S. Patent Application for Multipurpose Optical Reader, filed May 14, 2014 (Jovanovski et al.); 59 pages now abandoned., U.S. Appl. No. 14/277,337.

U.S. Patent Application for Terminal Having Illumination and Focus Control filed May 21, 2014 (Liu et al.); 31 pages; now abandoned, U.S. Appl. No. 14/283,282.

UK Further Exam Report in related UK Application No. GB1517842.9, dated Sep. 1, 2017, 5 pages.

Ulusoy et al., One-Shot Scanning using De Bruijn Spaced Grids, 2009 IEEE 12th International Conference on Computer Vision

(56) References Cited

OTHER PUBLICATIONS

Workshops, ICCV Workshops, 7 pages [Cited In EP Extended search report dated Apr. 10, 2017].
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017].
United Kingdom Combined Search and Examination Report in related Application No. GB1620676.5, dated Mar. 8, 2017, 6 pages.
United Kingdom combined Search and Examination Report in related GB Application No. 1607394.2, dated Oct. 19, 2016, 7 pages.
United Kingdom Search Report in related application GB1517842. 9, dated Apr. 8, 2016, 8 pages.
United Kingdom Search Report in related Application No. GB1700338. 5, dated Jun. 30, 2017, 5 pages.
Ward, Benjamin, Interactive 3D Reconstruction from Video, Aug. 2012, Doctoral Thesis, Univesity of Adelaide, Adelaide, South Australia, 157 pages.
Wikipedia, "3D projection" Downloaded on Nov. 25, 2015 from www.wikipedia.com, 4 pages.
Wikipedia, "Microlens", Downloaded from https://en.wikipedia.org/wiki/Microlens, p. 3. {Cited by Examiner in Feb. 9, 2017 Final Office Action in related matter}.
Wikipedia, YUV description and definition, downloaded from http://www.wikipeida.org/wiki/YUV on Jun. 29, 2012, 10 pages.
YUV Pixel Formal, downloaded from http://www.fource.org/yuv.php on Jun. 29, 2012; 13 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Observations by third parties Mailed on May 31, 2018 for EP Application No. 15176943.
Examiner initiated interview summary (PTOL-413B) dated Apr. 10, 2019 for U.S. Appl. No. 15/146,084.
Examiner initiated interview summary (PTOL-413B) dated Jan. 14, 2019 for U.S. Appl. No. 15/146,084.
Non-Final Rejection dated Jun. 27, 2018 for U.S. Appl. No. 15/146,084.
Notice of Allowance and Fees Due (PTOL-85) dated Apr. 10, 2019 for U.S. Appl. No. 15/146,084.
Notice of Allowance and Fees Due (PTOL-85) dated Jun. 18, 2019 for U.S. Appl. No. 15/146,084.
Office Action for related Chinese Application No. 201610557618.7 dated Apr. 8, 2020, 10 pages.
Requirement for Restriction/Election dated Jul. 26, 2017 for U.S. Appl. No. 15/146,084.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Intention to Grant in counterpart European Application No. 14157971.4 dated Apr. 14, 2015, pp. 1-8.
International Search Report for PCT/US2013/039438 (WO2013166368), Oct. 1, 2013, 7 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.

Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Leotta, Matthew, Generic, Deformable Models for 3-D Vehicle Surveillance, May 2010, Doctoral Dissertation, Brown University, Providence RI, 248 pages.
Lloyd, Ryan and Scott McCloskey, "Recognition of 3D Package Shapes for Singe Camera Melrology" IEEE Winter Conference on Applications of computer Visiona, IEEE, Mar. 24, 2014, pp. 99-106, (retrieved on Jun. 16, 2014), Authors are employees of common Applicant.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
Mike Stensvold, "get the Most Out of Variable Aperture Lenses", published on www.OutdoorPhotogrpaher.com dated Dec. 7, 2010; 4 pages, [As noted on search report retrieved from URL: http;//www.outdoorphotographer.com/gear/lenses/get-the-most-out-ofvariable-aperture-lenses.html on Feb. 9, 2016].
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Office Action for European Patent Application 18171435.3, dated May 6, 2019, 4 pages.
Office Action in counterpart European Application No. 13186043.9 dated Sep. 30, 2015, pp. 1-7.
Padzensky, Ron; "Augmera; Gesture Control", Dated Apr. 18, 2015, 15 pages [Examiner Cited Art in Office Action dated Jan. 20, 2017 in related Application.]
Peter Clarke, Actuator Developer Claims Anti-Shake Breakthrough for Smartphone Cams, Electronic Engineering Times, p. 24, May 16, 2011.
Proesmans, Marc et al. "Active Acquisition of 3D Shape for Moving Objects" 0-7803-3258-X/96 1996 IEEE; 4 pages.
Ralph Grabowski, "Smothing 3D Mesh Objects," New Commands in AutoCAD 2010: Part 11, Examiner Cited art in related matter Non Final Office Action dated May 19, 2017; 6 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Salvi, Joaquim et al. "Pattern Codification Strategies in Structured Light Systems" published in Pattern Recognition; The Journal of the Pattern Recognition Society, Accepted Oct. 2, 2003; 23 pages.
Santolaria et al. "A one-step intrinsic and extrinsic calibration method for tester line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
Search Report and Opinion in related GB Application No. 1517112. 7, dated Feb. 19, 2016, 6 Pages.
Decision to grant a European patent dated Aug. 17, 2018 for EP Application No. 15176943.
Benos et al., "Semi-Automatic Dimensioning with Imager of a Portable Device," U.S. Provisional Patent Application Filed Feb. 4, 2009 (now expired), 56 pages, U.S. Appl. No. 61/149,912.
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
Bosch Tool Corporation, "Operating/Safety Instruction for DLR 130", Dated Feb. 2, 2009, 36 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Chinese Notice of Reexamination in related Chinese Application 201520810313.3, dated Mar. 14, 2017, English Computer Translation provided, 7 pages.

(56) References Cited

OTHER PUBLICATIONS

Decision to Grant in counterpart European Application No. 14157971.4 dated Aug. 6, 2015, pp. 1-2.
Dimensional Weight-Wikipedia, the Free Encyclopedia, URL=hllp://en.wikipedia.org/wiki/Dimensional_weight, download date Aug. 1, 2008, 2 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
EKSMA Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
El-Hakim et al., "A Knowledge-based Edge/Object Measurement Technique", Retrieved from the Internet: URL: https://www.researchgate.net/profile/Sabry_E1-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
EP Extended Search Report in related EP Applicaton No. 17174843.7 dated Oct. 17, 2017, 5 pages.
EP Search and Written Opinion Report in related matter EP Application No. 14181437.6, dated Mar. 26, 2015, 7 pages.
EP Search Report in related EP Application No. 17171844 dated Sep. 18, 2017. 4 pages.
European Exam Report in related EP Applciation 16172995.9, dated Jul. 6, 2017, 9 pages.
European Exam Report in related EP Application No. 15176943.7, dated Apr. 12, 2017, 6 pages.
European Exam Report in related EP Application No. 15188440.0, dated Apr. 21, 2017.
European Exam Report in related EP Application No. 16152477.2, dated Jun. 20, 2017, 4 pages.
European Exam Report in related, EP Application No. 16168216.6, dated Feb. 27, 2017, 5 pages.
European Examination report in related EP Application No. 14181437.6, dated Feb. 8, 2017, 5 pages.
European extended Search report in related EP Application 13785171.3, dated Sep. 19, 2016, 8 pages.
European extended search report in related EP Application 16190833.0, dated Mar. 9, 2017, 8 pages.
European Extended search report in related EP Application No. 15190306.9, dated Sep. 9, 2016, 15 pages.
European Extended Search Report in Related EP Application No. 16172995.9, dated Aug. 22, 2016, 11 pages.
European Extended Search Report in related EP Application No. 16173429.8, dated Dec. 1, 2016, 8 pages.
European Extended Search Report in related EP Application No. 16190017.0, dated Jan. 4, 2017, 6 pages.
European Office Action for application EP 13186043, dated Jun. 12, 2014(now EP2722656 (Apr. 23, 2014)), Total of 6 pages.
European Patent Office Action for Application No. 14157971.4-1906, dated Jul. 16, 2014, 5 pages.
European Patent Search Report for Application No. 14157971.4-1906, dated Jun. 30, 2014, 6 pages.
European Search Report for application No. EP13186043 dated Feb. 26, 14 (now EP2722656 (Apr. 23, 2014)): Total pp. 7.
European Search Report for related Application EP 15190249.1, dated Mar. 22, 2016, 7 pages.
European Search Report for related EP Application No. 15188440.0, dated Mar. 8, 2016, 8 pages.
European Search Report for Related EP Application No. 15189214.8, dated Mar. 3, 2016, 9 pages.
European Search Report for related EP Application No. 16152477.2, dated May 24, 2016, 8 pages.
European Search Report from related EP Application No. 16168216.6, Dated Oct. 20, 2016, 8 pages.
European Search Report in related EP Application No. 15190315.0, dated Apr. 1, 2016, 7 pages.
European Search Report in related EP Application No. 17175357.7, dated Aug. 17, 2017, pp. 1-7.
Examination Report in related EP Application No. 15190315, dated Jan. 26, 2018, 6 pages.
Examination Report in related GB Application No. GB1517843.7, dated Jan. 19, 2018, 4 pages.
Extended European Search Report for corresponding European Application No. 18171435.3, Aug. 3, 2018, 6 pages.
Extended European search report in related EP Application 16199707.7, dated Apr. 10, 2017, 15 pages.
Extended European Search Report in related EP Application No. 16175410.0, dated Dec. 13, 2016, 5 pages.
Extended European Search report in related EP Application No. 17189496.7 dated Dec. 5, 2017; 9 pages.
Extended European Search report in related EP Application No. 17190323.0 dated Jan. 19, 2018, 6 pages.
First Office Action in Chinese Application No. 201610557618.7, dated Aug. 1, 2019, 18 pages including English translation.
Fukaya et al., "Characteristics of Speckle Random Pattern and Its Applications", pp. 317-327, Nouv. Rev. Optique, t.6, n.6. (1975) {Cited by Examiner in Feb. 9, 2017 Final Office Action in related matter: downloaded Mar. 2, 2017 from http://iopscience.iop.org}.
Grabowski, Ralph; "New Commands in AutoCADs 2010: Part 11 Smoothing 3D Mesh Objects" Dated 2011 (per examiner who cited reference), 6 pages, [Examiner Cited Art in Office Action dated Jan. 20, 2017 in related Application.]
Great Britain Combined Search and Examination Report in related Application GB1517842.9, dated Apr. 8, 2016, 8 pages.
Great Britain Search Report for related Application on. GB1517843.7, dated Feb. 23, 2016; 8 pages.
CN Notice of Allowance dated Sep. 8, 2020 for CN Application No. 201610557618.
CN Search report dated Jul. 11, 2019 for CN Application No. 201610557618.
Communication about intention to grant a European patent dated Feb. 1, 2018 for EP Application No. 15176943.
Communication about intention to grant a European patent dated Jun. 5, 2018 for EP Application No. 15176943.
Communication about intention to grant a European patent dated May 11, 2020 for EP Application No. 18171435.
Decision to grant a European patent dated Sep. 24, 2020 for EP Application No. 18171435.
English translation of CN Notice of Allowance dated Sep. 20, 2020 for CN Application No. 201610557618.
U.S. Appl. No. 14/250,923 for Imaging Terminal Having Data Compression filed Apr. 11, 2014, (Deng et al.), abandoned.

* cited by examiner

METHOD FOR A MOBILE DIMENSIONING DEVICE TO USE A DYNAMIC ACCURACY COMPATIBLE WITH NIST STANDARD

CROSS-REFERENCE TO RELATED APPLICATION

The present application is a continuation application of U.S. application Ser. No. 15/146,084, filed May 4, 2016, which claims the benefit of European Patent Application No. 15176943.7 for a Method for a Mobile Dimensioning Device to Use a Dynamic Accuracy Compatible with NIST Standard filed on Jul. 15, 2015 at the European Patent Office, the contents of which are hereby incorporated by reference in their entireties.

FIELD OF THE INVENTION

The present invention relates to mobile volume dimensioning devices.

BACKGROUND

A traditional Multiple Dimensioning Measurement Device (MDMD) captures the three dimensional size (i.e. length, width, height) of objects, such as parcels or pallets, based on the predetermined accuracy of the system. In the United States National Institutes of Standards and Technology (NIST) standard, this predetermined accuracy level of the system is known as the accuracy division.

Some MDMD devices support operations with different accuracy divisions, but these accuracy divisions are still predetermined. For example, an MDMD can provide a measurement with an accuracy of 1 cm for objects with dimensions smaller than 50 cm and can provide a measurement with an accuracy of 2 cm for objects with dimensions greater than 50 cm.

Predetermined accuracy divisions work for fixed dimensioning systems because the parameters of the measurement environment are known in fixed dimensioning systems. For example, for fixed MDMDs, the distance to the object to be measured, the viewing angle, and other parameters are limited by the installation of the device.

However, in the case of a Mobile Dimensioning Device (MDD), many of the parameters that influence the accuracy of the system cannot be controlled. Because of the dynamic nature of its accuracy, MDDs are not easily compatible with a NIST certification that requires the accuracy division to be reported in advance of the actual measurement. This lack of NIST certification generally prohibits MMDs from being used for commercial transactions.

Therefore, a need exists for a mobile dimensioning device that uses a dynamic accuracy division while remaining compatible with the NIST standard.

SUMMARY

Accordingly one aspect of the present invention discloses a mobile dimensioning device, comprising: a display; non-volatile storage; one or more sensors; an input subsystem; one or more processors; and memory containing instructions executable by the one or more processors whereby the device is operable to: derive one or more accuracy parameters based on information received from the one or more sensors for a measurement environment of an object being measured; compute an accuracy level based on the one or more accuracy parameters; determine if the accuracy level corresponds to a sufficient measurement environment; if the accuracy level corresponds to a sufficient measurement environment; display, on the display, an indication that the measurement environment is sufficient and a capture icon to enable the measurement capture; in response to an input received at the capture icon, capture the measurement; display, on the display, the dimensions of the object; and record the dimensions of the object.

In additional exemplary embodiments, the accuracy level is the accuracy division as defined by the National Institutes of Standards and Technology (NIST) standard.

In still other embodiments, the accuracy parameters comprise at least one of the group consisting of: distance to the object, viewing angle relative to the object, temperature, ambient light, and quality of data from the one or more sensors.

In further embodiments, the one or more sensors comprise at least one of the group consisting of: optical sensors and measurement sensors.

In additional embodiments, the optical sensors are selected from a group consisting of: a barcode sensor, a camera, and an image sensor.

In some embodiments, the measurement sensors are selected from a group consisting of: point-cloud projection, structured light, and stereoscopic cameras and n-scopic cameras.

In another embodiment, the sufficient measurement environment is an environment where the accuracy division has a low value.

In more embodiments, displaying, on the display, an indication that the measurement environment is sufficient comprises at least one of the group consisting of: displaying the accuracy division, displaying an icon to enable the measurement capture, removing the indications for improving the measurement environment, displaying a completed progress bar, and displaying a confirmation icon.

In still other embodiments, displaying, on the display, the dimensions of the object comprises displaying the dimensions of the object.

And yet in further embodiments, displaying, on the display, the dimensions of the object comprises displaying the dimensions of the object and the corresponding accuracy divisions.

In some embodiments, computing an accuracy level based on the accuracy parameters comprises running multivariable regression on the accuracy parameters.

In other embodiments, the dimensions of the object and the accuracy level are stored in the non-volatile storage.

In still further embodiments, the device is further operable to: determine that the object being measured has been previously measured; retrieved the dimensions of the object and the accuracy level from the from the non-volatile storage; display, on the display, the dimensions of the object and the accuracy level from the from the non-volatile storage; and record the dimensions of the object and the accuracy level from the from the non-volatile storage.

In further embodiments, the device is further operable to: if the accuracy level does not correspond to a sufficient measurement environment; provide an indication for improving the measurement environment.

In still further embodiments, the indication for improving the measurement environment comprises at least one of group consisting of: a textual instruction, a graphical instruction, and a graphical icon.

In additional embodiments, the indication for improving the measurement environment comprises at least one of the group consisting of: an indication for shortening the distance to the object, an indication for improving the viewing angle relative to the object, an indication to delay measurement pending a target operating temperature, and indication for improving the ambient light, and an indication for adjusting the one or more sensors to improve the quality of data.

An additional aspect of the present invention discloses a mobile dimensioning device, comprising: a display; non-volatile storage; one or more sensors; an input subsystem; one or more processors; and memory containing instructions executable by the one or more processors whereby the device is operable to: derive one or more accuracy parameters based on information received from the one or more sensors for a measurement environment of an object being measured; compute an accuracy level based on the one or more accuracy parameters; determine if the accuracy level corresponds to a sufficient measurement environment; if the accuracy level corresponds to a sufficient measurement environment; display, on the display, an acceptance icon to enable the display of the accuracy level; display, on the display, the accuracy level and a capture icon to enable measurement capture.

In another embodiment, the device is further operable to: in response to an input received at the capture icon, capture the measurement display, on the display, the dimensions of the object; and record the dimensions of the object.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces the concept of a mobile dimensioning device that uses a dynamic accuracy while still being compatible with the NIST standard. Even if the accuracy division is dynamic and not predetermined, a mobile dimensioning device of the present invention reports the actual dimensioning prior to measurement capture and can therefore be certified and used in commercial transactions. Moreover, since the NIST standard for MDMD is derived from the International Organization of Legal Metrology (OIML) R 129 standard, a mobile dimensioning device of the present invention should be compliant with the OIML R 129 standard as well as any other standard derived from the OIML R 129.

Figure 1:
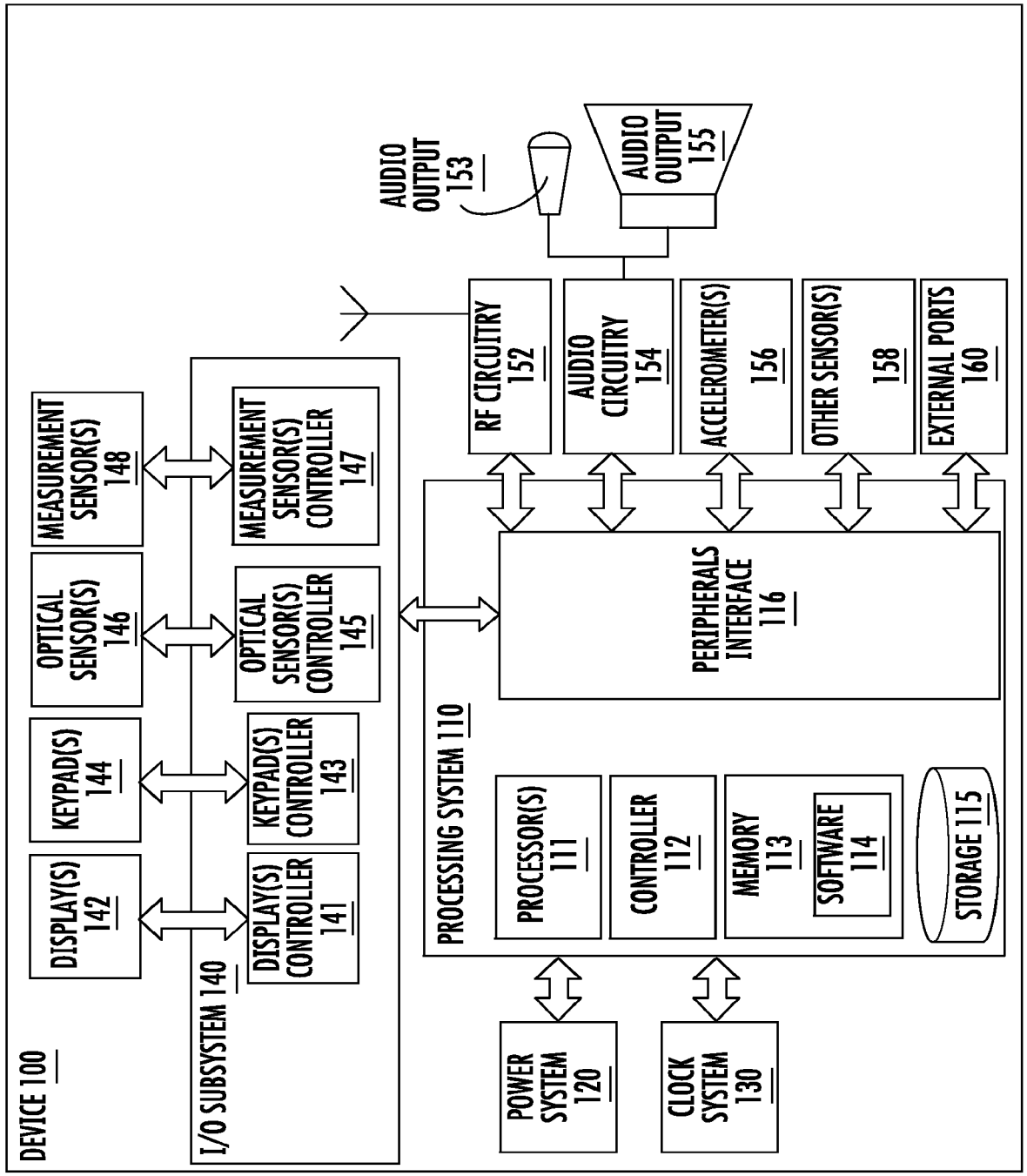
FIG. 1 is a block diagram of the hardware elements of a device according to embodiments of the disclosed subject matter.

FIG. 1 illustrates an exemplary device 100, such as a mobile dimensioning device, for one embodiment of the present invention. The device 100 may include other components not shown in FIG. 1, nor further discussed herein for the sake of brevity. One having ordinary skill in the art will understand the additional hardware and software included but not shown in FIG. 1.

In general, device 100 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, pagers, two-way radios, netbooks, barcode scanners, radio frequency identification (RFID) readers, intelligent sensors, tracking devices, volume dimensioning devices, mobile dimensioning devices, and other similar computing devices.

In general, as shown, the mobile dimensioning device 100 of FIG. 1 includes a processing system 110 that includes one or more processors 111, such as Central Processing Units (CPUs), Application Specific Integrated Circuits (ASICs), and/or Field Programmable Gate Arrays (FPGAs), a memory controller 112, memory 113, which may include software 114, and other components that are not shown for brevity, such as busses, etc. The processing system may also include storage 115, such as a hard drive or solid state drive.

The processing system 110 also includes a peripherals interface 116 for communicating with other components of the mobile dimensioning device 100, including but not limited to, radio frequency (RF) circuitry 152, such as Wi-Fi and/or cellular communications circuitry such as wireless Ethernet, Bluetooth, and near field communication (NFC), audio circuitry 154 for the audio input component 153, such as a microphone, and audio output component 155, such as a speaker, one or more accelerometers 156, one or more other sensors 158, such as a location determination component such as a Global Positioning System (GPS) chip, and one or more external ports 160, which may be used for smart card readers or for wired connections such as wired Ethernet, USB, serial or I²C ports. The RF circuitry 152 and external ports 160 individually and collectively make up the communication interfaces for the mobile dimensioning device 100. The processing system 110 is also connected to a power system component 120 that is used to power the mobile dimensioning device 100, such as a battery or a power supply unit. The processing system 110 is also connected to a clock system component 130 that controls timing functions.

The peripherals interface 116 may also communicate with an Input/Output (I/O) subsystem 140, which includes a display(s) controller 141 operative to control display(s) 142. In some embodiments the display(s) 142 is a touch-sensitive display system, and the display(s) controller 141 is further operative to process touch inputs on the touch sensitive display 142. The I/O subsystem 140 may also include a keypad(s) controller 143 operative to control keypad(s) 144 on the mobile dimensioning device 100. The I/O subsystem 140 also includes an optical sensor(s) controller 145 operative to control one or more optical sensor(s) 146. The optical sensor(s) may include, but is not limited to, a barcode sensor, a camera, and an image sensor. The I/O subsystem 140 also includes a measurement sensor(s) controller 147 operative to control one or more measurement sensor(s) 148. The measurement sensor(s) may include, but is not limited to, a point-cloud projection sensor, a structured light sensor, a stereoscopic camera, and a n-scopic camera. The components of mobile dimensioning device 100 may be interconnected using one or more buses, represented generically by the arrows of FIG. 1, and may be mounted on a motherboard (not shown) or some other appropriate configuration.

Figure 2B:
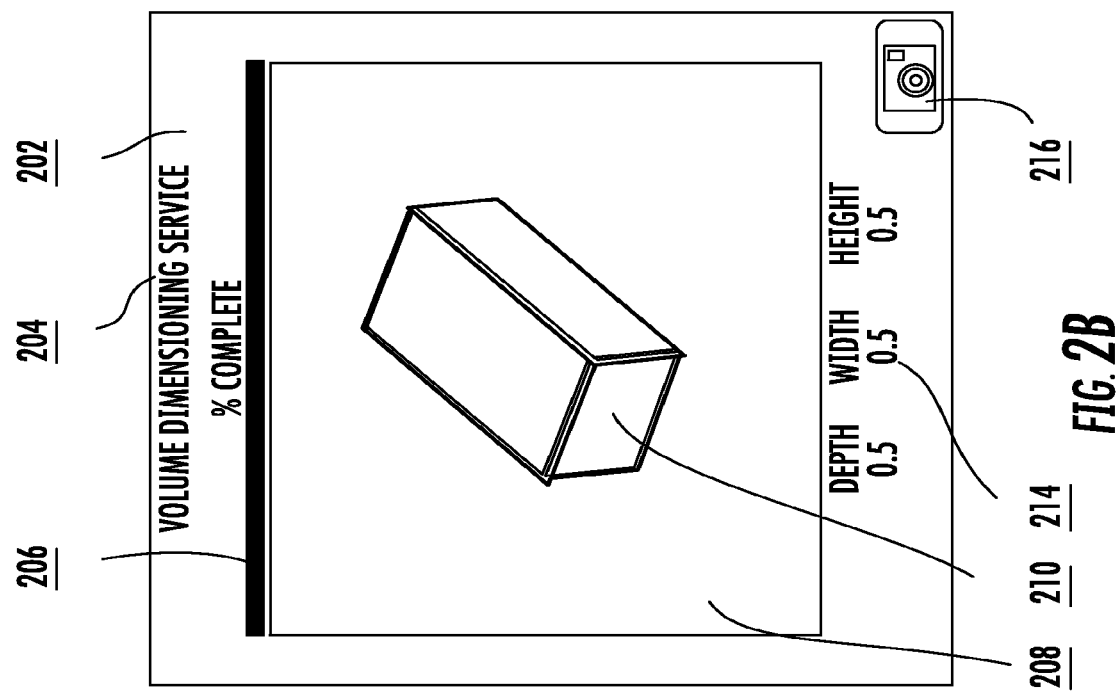
FIGS. 2A, 2B, and 2C are an example of a graphical user interface (GUI) of the system in accordance with one embodiment of the disclosed subject matter.
Figure 2A:
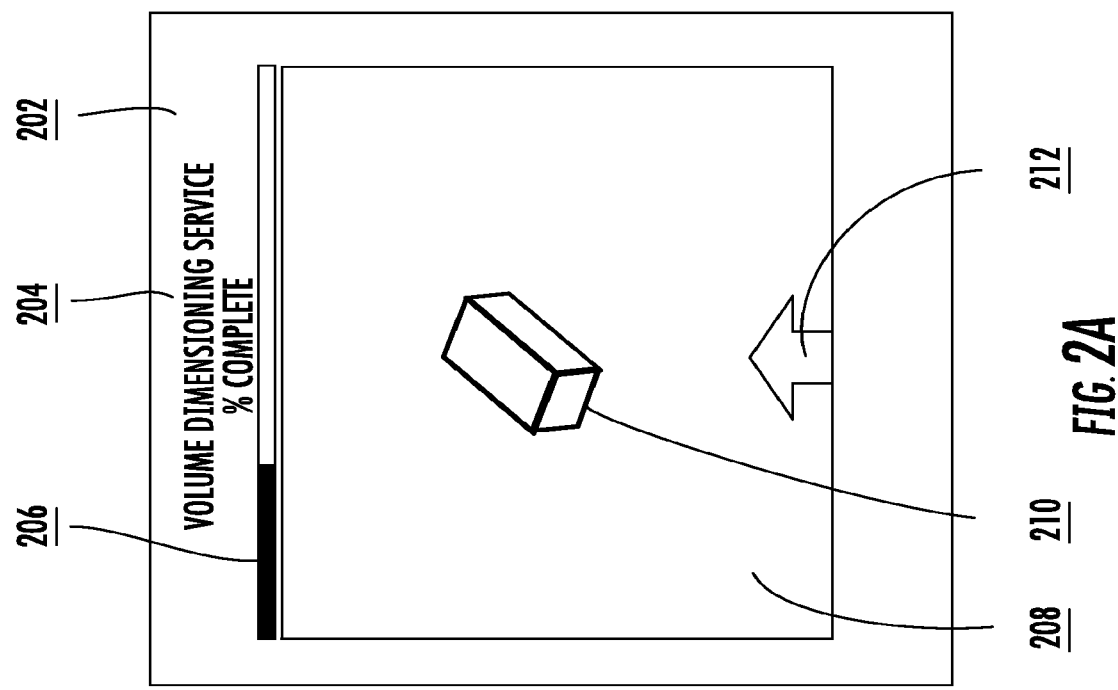

FIG. 2A is an example of a graphical user interface (GUI) that would be displayed on the display 142 of the mobile dimensioning device 100 in accordance with one embodiment of the disclosed subject matter. FIG. 2A is a representative GUI during the phase while the mobile dimensioning device is finding a sufficient measurement environment for measuring an object.

The elements of FIG. 2A are now described. The main window of the interface 202 has a title field 204 and a progress bar 206 as well as a viewing window 208. The viewing window 208 currently shows an object to be measured 210, for example, a box to be shipped. In some embodiments, the object to be measured 210 can be highlighted in the viewing window 208 in some manner, such as with a green outline. Overlaid onto or integrated with the viewing window 208 is a guidance indication 212, represented by, but not limited to, an arrow in FIG. 2A.

The guidance indication 212 may be a textual instruction, a graphical instruction, a graphical icon, or any combination therein. The guidance indication 212 provides information that guides the mobile dimensioning device 100 to a measurement environment sufficient for measuring an object. The guidance indication 212 is based on the dynamic accuracy level of the mobile dimensioning device 100.

In a preprocessing phase, the mobile dimensioning device 100 computes its accuracy level dynamically as a function of all of the parameters that influence it. Any kind of measureable parameter influencing accuracy can be included in the model for computing the accuracy level of the mobile dimensioning device 100. The list of parameters includes, but is not limited to, distance of the mobile dimensioning device 100 to the object being measured, the viewing angle of the camera or optical sensor in the mobile dimensioning device 100 relative to the object being measured, temperature of the mobile dimensioning device 100, ambient light, and quality of data from the one or more sensors of the mobile dimensioning device 100. Individually and collectively, these parameters make up the measuring environment for measuring the object. In one embodiment, the accuracy level may be computed, for example, using multivariable regression on the parameters influencing the accuracy.

Note that in some embodiments, the mobile dimensioning device 100 records a variety of raw data from the sensors. The mobile dimensioner device, through hardware and software, transforms that data into the accuracy parameters that are used to compute the accuracy level for a given the measurement environment.

Once the dynamic accuracy level is computed, it is used to guide the mobile dimensioning device 100 to a measurement environment sufficient for measuring the object. In one embodiment, this is accomplished by identifying accuracy levels with a low accuracy division value. In general, dimensioning error is reduced as the mobile dimensioning device 100 gets closer to the object and has the proper viewing angle for capturing the object, thus reducing the accuracy division. The lower the accuracy division value, the more optimal the measuring environment.

Examples of the types of guidance provided by the guidance indication 212 include, but are not limited to, shortening the distance to the object, improving the viewing angle relative to the object, delaying measurement pending a target operating temperature, and improving the ambient light, adjusting the one or more sensors to improve the quality of data.

In some embodiments, the progress bar 206 appears with other guidance indications 212. As shown in FIG. 2A, the progress bar 206 works in tandem with the guidance indication 212 to guide the mobile dimensioning device 100 to a sufficient measurement environment, showing a reading of 0% complete when the mobile dimensioning device has an insufficient measurement environment and 100% when the mobile dimensioning device has found a sufficient measurement environment.

FIG. 2B is an example of a GUI of the system in accordance with one embodiment of the disclosed subject matter. FIG. 2A is a representative GUI after the mobile dimensioning device has found a sufficient measurement environment for measuring an object.

FIG. 2B adds some additional elements beyond FIG. 2A. Once the mobile dimensioning device has found a sufficient measurement environment for measuring an object, the mobile dimensioning device 100 displays an accuracy division field 214. In FIG. 2B, the accuracy division field 214 shows one accuracy division per dimension, but the present invention is not limited thereto. Note also that the progress bar 206 now shows 100%, indicating that the measurement environment is sufficient. FIG. 2A also shows a capture icon 216 which is used to capture the measurement of the object in response to an input at the mobile dimensioning device 100. In other embodiments, the capture icon 216 could be implemented in any of a variety of ways using different elements understood in the art of GUI design for receiving input. In other embodiments, the capture icon 216 would not be part of the GUI but rather would be a hardware button on the mobile dimensioning device 100 that becomes active when the device is enabled to capture the measurement. Note that the capture icon 216 is only visible when the measuring environment is sufficient for measuring the object. Note also that the guidance indication 212 is no longer shown, as the mobile dimensioning device has found a sufficient environment for taking the measurement. All of these visual cues in the GUI (i.e. the displaying of the accuracy division field 214, the completed progress bar 206, the capture icon 216, and the absence of the guidance indication 212) are examples of indications that the measurement environment is sufficient.

Note that because mobile dimensioning device 100 reveals the accuracy division prior to permitting or enabling the actual measurement of the object, the mobile dimensioning device is compatible with the NIST standard.

Figure 2C:
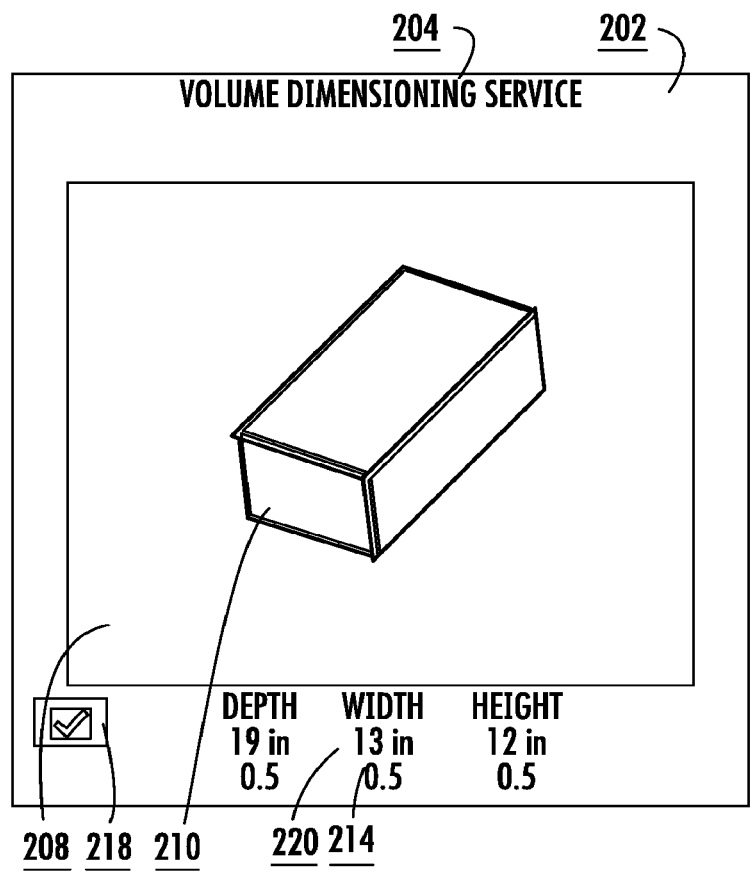

FIG. 2C is an example of a GUI of the system in accordance with one embodiment of the disclosed subject matter. FIG. 2C is a representative GUI after the mobile dimensioning device 100 has captured the measurements of the object.

In some embodiments, the mobile dimensioner device 100 records an infra-red (IR) image of a pattern of light projected on an object being measured. The mobile dimensioner device, though hardware and software, transform the image into three dimensional data about the object. That three dimensional data is used to derive an accurate measurement for the object. This process of deriving the accurate measurement for the object is known as capturing the measurement. Capturing the measurement can be done by the mobile dimensioning device 100 after the accuracy division has been displayed either automatically or in response to an input.

FIG. 2C adds some additional elements beyond FIG. 2A and FIG. 2B. Because the measurement has now been captured, it is possible to present the dimension field 220. In some embodiments, and additional confirmation icon 218 is provided to confirm that the measurement has been captured, such as but not limited to the check mark icon shown in FIG. 2C.

FIGS. 3A, 3B, 3C, and 3D are an example of a GUI of the system in accordance with an alternative embodiment of the disclosed subject matter. In this embodiment, neither the dimensions of the object nor the accuracy division are shown until the measurement environment is sufficient for measuring the object. Then a button or icon is shown to enable the capture.

Figure 3B:
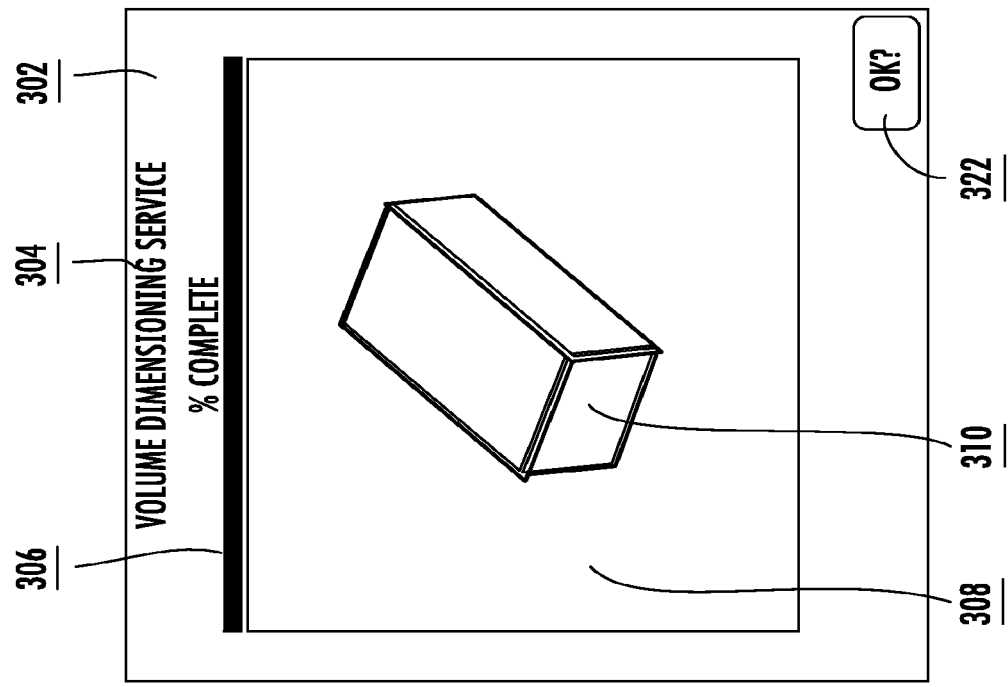
FIGS. 3A, 3B, 3C, and 3D are an example of a GUI of the system in accordance with one embodiment of the disclosed subject matter.
Figure 3A:
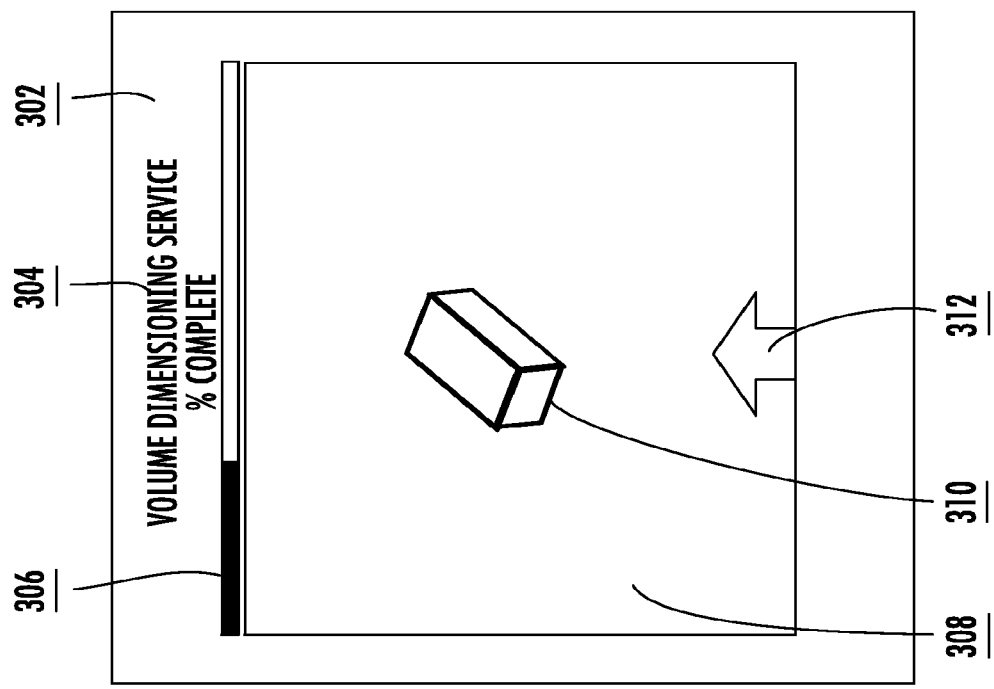

FIG. 3A has similar elements to FIG. 2A. FIG. 3A shows the preprocessing phase of the alternative embodiment. The main window of the interface 302 has a title field 304 and a progress bar 306 as well as a viewing window 308. The viewing window 308 currently shows an object to be measured 310, for example, a box to be shipped. In some embodiments, the object to be measured 310 can be highlighted in the viewing window 308 in some manner, such as with a green outline. Overlaid onto or integrated with the viewing window 308 is a guidance indication 312, represented by, but not limited to, an arrow in FIG. 3A. As described earlier, the guidance indication 312 may be a textual instruction, a graphical instruction, a graphical icon, or any combination therein.

Also, as discussed earlier, in the background the mobile dimensioning device 100 computes its accuracy level dynamically to help the mobile dimensioning device 100 identify a measurement environment sufficient for measuring the object.

FIG. 3B is similar to FIG. 2B. FIG. 3B is a representative GUI after the mobile dimensioning device has found a sufficient measurement environment for measuring an object according to the alternative embodiment.

In FIG. 3B, the progress bar 206 now shows 100%, indicating that the measurement environment is sufficient. In this alternative embodiment, an acceptance icon 322 is provided to confirm that the measurement environment is sufficient to measure the object. Note that neither the dimensions nor the accuracy division are shown in FIG. 3B. The acceptance icon 322 enables the display of the accuracy level.

Figure 3D:
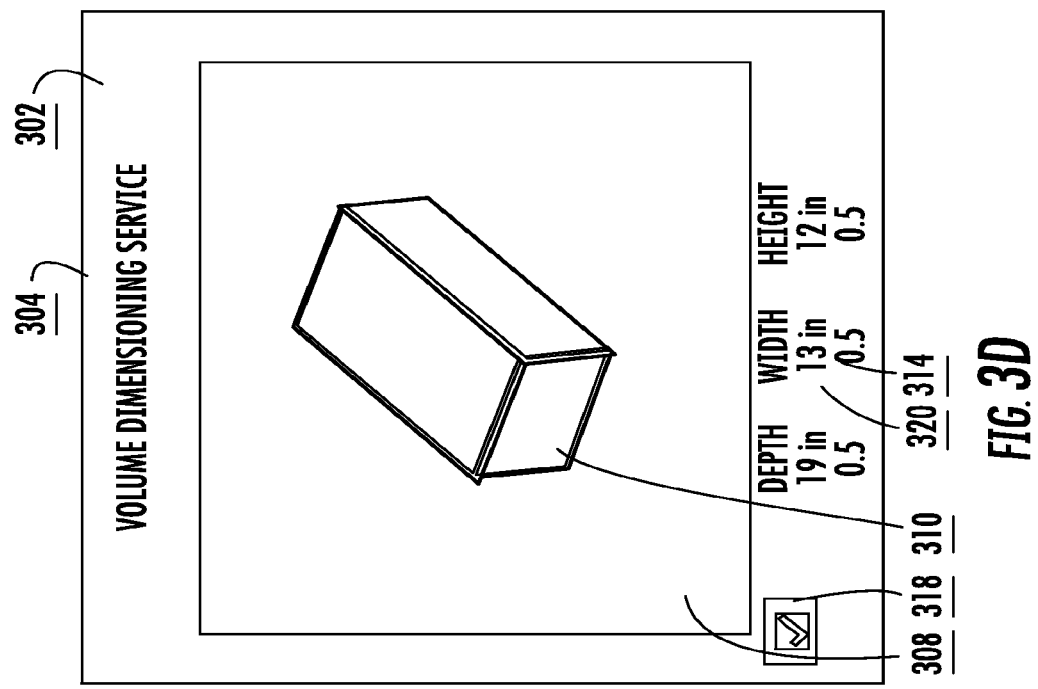
Figure 3C:
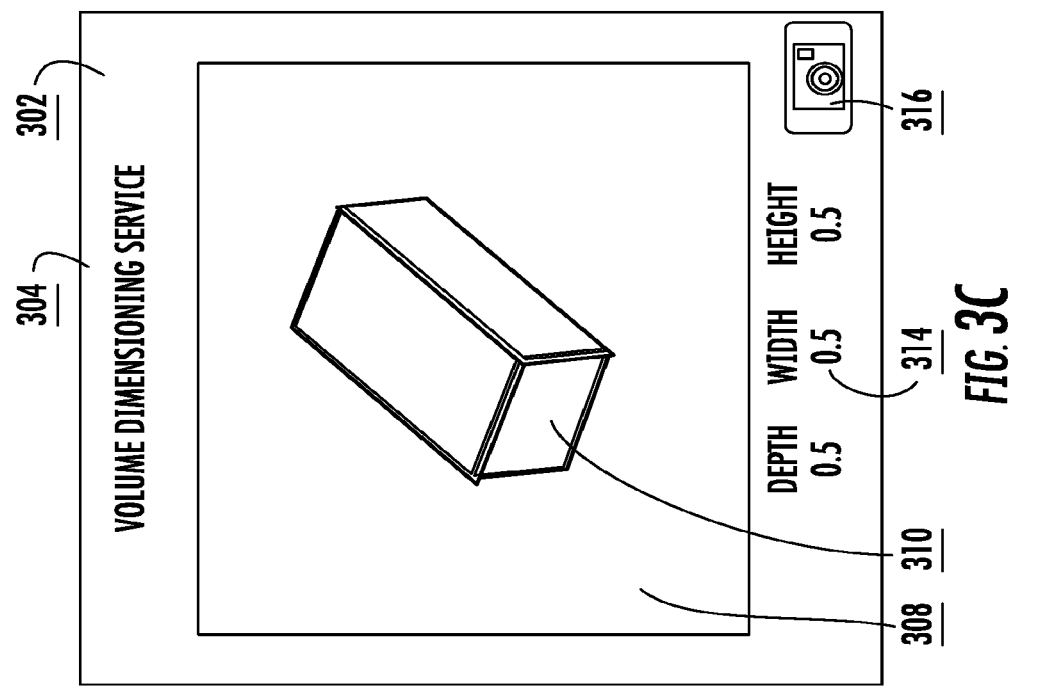

In response to an input received at the acceptance icon 322, the accuracy level will be displayed as shown in FIG. 3C. Note that only the accuracy division field 314 is shown. FIG. 3C also provides a capture icon 316 to enable the measurement capture. In response to an input involving the capture icon 316, the mobile dimensioning device will capture the measurements. In other embodiments, recording the measurements may be automatic after capture.

FIG. 3D is an exemplary GUI that is displayed after the measurement has been captured. Note now that both the accuracy division field 314 and the actual dimension field 320 are both shown. In some embodiments, an additional confirmation icon 318, such as but not limited to the check mark icon shown in FIG. 3D, is provided to confirm that the measurement has been captured.

Figure 4:
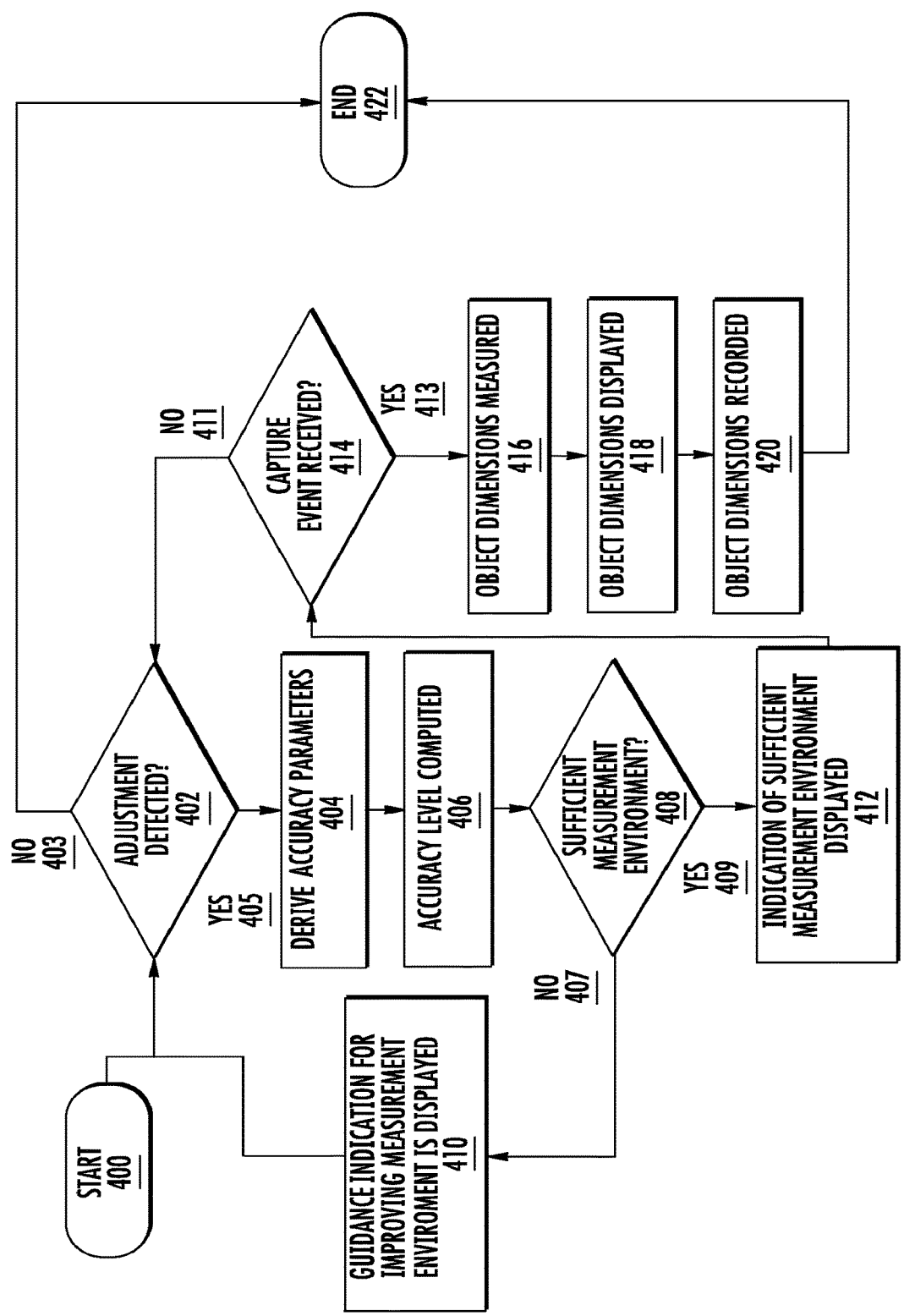
FIG. 4 is a flow chart outlining the process for operating a device in accordance with embodiments of the disclosed subject matter.

FIG. 4 is a flow chart outlining the process for operating a mobile dimensioning device in accordance with embodiments of the disclosed subject matter.

The process begins in FIG. 4 at Step 400 followed by Step 402 in which a check is made to see if an adjustment to the mobile dimensioning device has been detected. The adjustment to the mobile dimensioning device can be a random movement of the device itself or any of the components of the device. In some embodiments, the adjustment to the mobile dimensioning device represents movements that correspond to the types of guidance described earlier by the guidance indication 212, 312. If no adjustment has been detected (Path 403), then the process ends (Step 422).

If an adjustment has been detected (Step 405), then the mobile dimensioning device 100 derives the new accuracy parameters that correspond to the new measurement environment (i.e. the measurement environment after the adjustment to the mobile dimensioning device) based on information received from the sensors (Step 404). The mobile dimensioning device 100 then compute an accuracy level based on the one or more accuracy parameters (Step 406).

The mobile dimensioning device 100 then checks to see if the measurement environment is sufficient for measurement of the object (Step 408). If not (Path 407), then guidance indications for improving the measurement environment are displayed (Step 410). The indications for improving the measurement environment were described earlier. These are the guidance indications 212, 312. Examples include, but are not limited to, shortening the distance to the object, improving the viewing angle relative to the object, delaying measurement pending a target operating temperature, and improving the ambient light, adjusting the one or more sensors to improve the quality of data.

If the measurement environment is sufficient for measurement of the object (Path 409), then the mobile dimensioning device displays indications of sufficient measurement environment (Step 412). As described earlier, the indication of sufficient measurement environment include but are not limited to: displaying of the accuracy division, displaying a completed progress bar, displaying a capture icon, and the removal of the guidance indications.

The mobile dimensioning device 100 then checks to see if a capture event is received (Step 414). The capture event triggers the actual measurement of the object. In some embodiments, the capture event occurs automatically. In other embodiments, the capture event occurs in response to an input received at the mobile dimensioning device 100.

If no capture event is detected (Path 411), then the mobile dimensioner device checks to see if an adjustment has been detected (Step 402) as described earlier.

If a capture event is detected (Path 413), then the dimensions of the object are actually measured (Step 416), the dimensions are displayed (Step 418), and the dimensions are recorded (Step 420). In some embodiments, when the object dimensions are displayed, the associated accuracy division for each dimension is also displayed. In other embodiments, only the object dimensions are displayed. The process then ends (Step 422).

In this respect, the processes described in the figures should make it clear to a person of ordinary skill in the art how the mobile dimensioner device 100 of the present invention uses a dynamic accuracy while still being compatible with the NIST standard and can therefore be certified and used in commercial transactions.

To supplement the present disclosure, this application incorporates entirely by reference the following commonly assigned patents, patent application publications, and patent applications: U.S. Pat. No. 6,832,725;
U.S. Pat. No. 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;

U.S. Pat. No. 8,463,079;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,526;
U.S. Pat. Nos. 8,798,367; 8,807,431;
U.S. Pat. Nos. 8,807,432; 8,820,630;
U.S. Pat. No. 8,854,633;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0202702;
U.S. Patent Application Publication No. 2010/0220894;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;

U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0267609;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile dimensioning device, comprising:
 a display;
 a non-volatile storage;
 a sensor;
 an input subsystem;
 a processor; and
 a memory comprising computer-executable instructions that, when executed by the processor, cause the mobile dimensioning device to:
  derive an accuracy parameter based on information received from the sensor for a measurement environment of an object being measured;
  compute an accuracy level based on the accuracy parameter;
  in response to determining that the accuracy level corresponds to a sufficient measurement environment, display, on a user interface of the display, an acceptance icon to facilitate the display of the accuracy level; and
  in response to receiving a user selection of the acceptance icon via the user interface, trigger displaying, on the user interface of the display, the accuracy level associated with measuring a dimension of the object in the measurement environment and a capture icon to facilitate measuring the dimension of the object.

2. The mobile dimensioning device of claim 1, wherein the accuracy level corresponds to a National Institutes of Standards and Technology (NIST) standard associated with accuracy.

3. The mobile dimensioning device of claim 2, wherein the sufficient measurement environment is an environment where an accuracy division has a value lower than a predetermined value.

4. The mobile dimensioning device of claim 1, wherein the accuracy parameter is associated with at least one of: a distance to the object, a viewing angle relative to the object, a temperature, ambient light, or a quality of data from the sensor.

5. The mobile dimensioning device of claim 1, wherein the sensor is at least one of: an optical sensor or a measurement sensor.

6. The mobile dimensioning device of claim 5, wherein the optical sensor is at least one of: a barcode sensor, a camera, or an image sensor.

7. The mobile dimensioning device of claim 5, wherein the measurement sensor is at least one of: a point-cloud projection sensor, a structured light sensor, a stereoscopic camera, or an n-scopic camera.

8. The mobile dimensioning device of claim 1, wherein the computer-executable instructions, when executed by the processor, cause the mobile dimensioning device to further:
 display, on the display, an indication that the measurement environment is sufficient, comprising at least one of: displaying an accuracy division, displaying an icon to facilitate capture of dimensions of the object, removing indications for improving the measurement environment, displaying a completed progress bar, or displaying a confirmation icon.

9. The mobile dimensioning device of claim 1, wherein computing the accuracy level based on the accuracy parameter comprises calculating multivariable regression on the accuracy parameter.

10. The mobile dimensioning device of claim 1, wherein the computer-executable instructions, when executed by the processor, cause the mobile dimensioning device to further:
 in response to determining that the accuracy level does not correspond to the sufficient measurement environment, provide an indication for improving the measurement environment.

11. The mobile dimensioning device of claim 10, wherein the indication for improving the measurement environment comprises at least one of: a textual instruction, a graphical instruction, or a graphical icon.

12. The mobile dimensioning device of claim 10, wherein the indication for improving the measurement environment comprises at least one of: an indication for shortening a distance to the object, an indication for improving a viewing angle relative to the object, an indication to delay measurement pending a target operating temperature, an indication for improving an ambient light, or an indication for adjusting the sensor to improve a quality of data.

13. The mobile dimensioning device of claim 1, wherein the computer-executable instructions, when executed by the processor, cause the mobile dimensioning device to further:
 in response to an input received associated with the capture icon, capture measurement;
 display, on the display, dimensions of the object; and
 record the dimensions of the object.

14. The mobile dimensioning device of claim 1, wherein, when displaying the accuracy level and the capture icon on the user interface, the computer-executable instructions, when executed by the processor, cause the mobile dimensioning device to further:
 display an accuracy division for each dimension of the object on the user interface.

15. A method for measuring dimensions of an object, comprising:

deriving, based on information received from a sensor, an accuracy parameter that is associated with an accuracy level for a measurement environment of the object being measured;

computing the accuracy level based on the accuracy parameter;

determining if the accuracy level is sufficient for the measurement environment;

in response to the accuracy level being sufficient for the measurement environment, displaying, on a user interface of a display, an acceptance icon to facilitate displaying the accuracy level; and in response to receiving a user selection of the acceptance icon via the user interface, causing the accuracy level associated with measuring dimensions of the object in the measurement environment and a capture icon, configured to facilitate measuring the dimensions of the object, to be displayed on the display.

16. The method for measuring the dimensions of the object of claim 15, wherein the capture icon is caused to be displayed on the display with an indication that the measurement environment is sufficient.

17. The method for measuring the dimensions of the object of claim 15, wherein the accuracy parameter is associated with at least one of: a distance to the object, a viewing angle relative to the object, a temperature, ambient light, or a quality of data from the sensor.

18. The method for measuring the dimensions of the object of claim 15 further comprising:

in response to the accuracy level being not sufficient for the measurement environment, providing an indication for improving the measurement environment.

19. The method for measuring the dimensions of the object of claim 18, wherein the indication for improving the measurement environment comprises at least one of: a textual instruction, a graphical instruction, or a graphical icon.

20. The method for measuring the dimensions of the object of claim 15, wherein, when displaying the accuracy level and the capture icon on the user interface, the method further comprises:

display an accuracy division for each dimension of the object on the user interface.

* * * * *